(No Model.)
J. R. LANE.
HAND PLANTER AND FERTILIZER DISTRIBUTER.
No. 596,459. Patented Dec. 28, 1897.
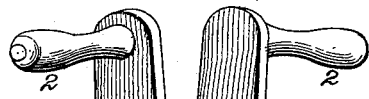
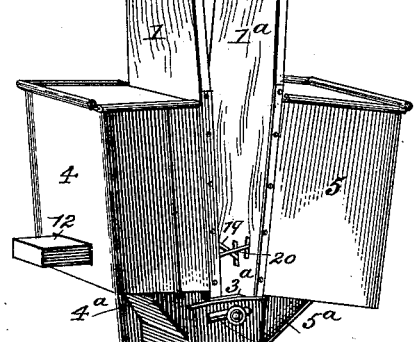
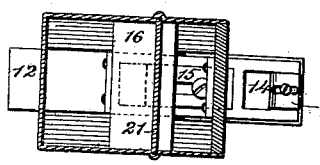
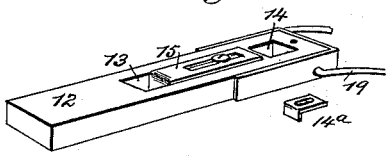
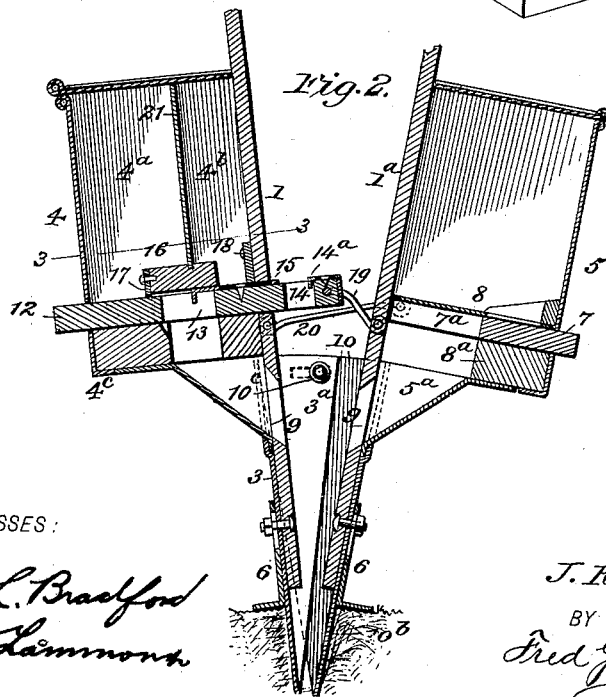
WITNESSES:
Edwin L. Bradford
N. Curtis Lammons
INVENTOR
J. R. Lane
BY
Fred G. Dieterich & Co.
ATTORNEYS
THE NORRIS PETERS CO., PHOTO-LITHO., WASHINGTON, D. C.

UNITED STATES PATENT OFFICE.

JAMES R. LANE, OF GATE CITY, VIRGINIA, ASSIGNOR OF ONE-HALF TO
W. E. TAYLOR, OF SAME PLACE.

HAND PLANTER AND FERTILIZER-DISTRIBUTER.

SPECIFICATION forming part of Letters Patent No. 596,459, dated December 28, 1897.

Application filed July 15, 1897. Serial No. 644,640. (No model.)

*To all whom it may concern:*

Be it known that I, JAMES R. LANE, residing at Gate City, in the county of Scott and State of Virginia, have invented a new and Improved Hand Planter and Fertilizer-Distributer, of which the following is a specification.

This invention is in the nature of an improved combined hand planter and fertilizer-distributer; and it has for its object to provide a planter and fertilizer means which can be utilized to plant corn, beans, and fertilizer at the same time and with the same motion, it being also capable of use for planting corn-seed or smaller and larger grain than corn and also for planting potatoes.

The invention also has for its object to provide a hand planter of this kind of a very simple and inexpensive construction which can be easily manipulated and in which the several parts are so arranged that they can be readily assembled or detached and which will effectively serve for their intended purposes.

With other objects in view, which will hereinafter be referred to, the invention consists in the novel combination and arrangement of parts, such as will be first described in detail and then be specifically pointed out in the appended claims, reference being had to the accompanying drawings, in which—

Figure 1 is a perspective view of my improvement. Fig. 2 is a vertical section of the same, the several parts being shown in their dropping position. Fig. 3 is a horizontal section taken on the line 3 3 of Fig. 2. Fig. 4 is a detail view of the combined seed and fertilizer dropping slide.

In the construction my invention comprises a pair of members 1 1$^a$, having handles 2 2 at the upper end, the member 1 carrying the hopper 4, and the other, 1$^a$, the hopper 5, which hoppers 4 and 5 are disposed in the same horizontal plane, as clearly shown.

The lower end of the arm or member 1 has a sheet-metal extension 3, having short inturned angular sides 3$^a$, which telescope with the wider side members 10 of the metal extension 10$^b$, secured to the lower end of the member 1$^a$ and which at the upper ends have suitable curved slots 10$^a$ to receive the pivot-bolts 10$^c$, secured to the sides 3$^a$ and which form the fulcrum for the two sections of the planter, the side portions 3$^a$ and 10 serving to provide inclosing ends of a seed and fertilizer receiving compartment, which is alternately opened and closed at the lower end as the members are drawn outward or inward. The lower or metal ends 3 and 10$^b$ are pointed, and the sides 3$^a$ and 10 are made tapering to facilitate the entrance of the said ends into the ground.

To provide for planting at a uniform depth, guards or stops 6 are adjustably secured to the members 3 and 10$^b$, having foot portions to engage the ground and limit the penetration of the lower ends of the planter.

The hopper 4 has its bottom 4$^c$ provided with a discharge-opening adjacent the member 1, which communicates with a chute 4$^a$, which discharges through the opening 9 in the said member 1, the bottom of hopper 5 being similarly provided with an opening 8$^a$, which discharges through the chute 5$^a$ and opening 9 in the member 1$^a$.

The hopper 5 is preferably used as a fertilizer-holder, it being, however, obvious that when the planter is made of proper size such hopper can serve as a potato-holder when it is desired to plant potatoes together with the smaller grain. The hopper 5 has a removable cover and a slotted base-bottom 8, between which and the bottom proper of such hopper operates the slide 7, having an opening 7$^a$ at its inner end, as shown.

The hopper 4 has a detachable division-plate 21, which divides the hopper into two compartments, one of which (the larger) is used for corn, while the smaller is used for beans. The lower end of the plate 21 seats in a transverse piece 16, which is of a width sufficient to form a cut-off when the slide 12 is drawn to a dropping position, it covering the corn-opening 13 in such slide, which has an adjusting-plate 15 to regulate the size of the opening 13, as shown in Figs. 2 and 4.

The slide 12 is of a length greater than the length of the hopper, its ends extending through slots in the front and rear sides thereof. The inner end of the slide 12 has a dropping-opening 14, the size of which is regulated by a slide 14$^a$, which opening when the members 1 and 1$^a$ are brought together moves into the hopper under the compartment 4ᵇ as the opening 13 moves under the compartment 4ᵃ, and when the said members 1 and 1ᵃ are separated at the top such opening is moved outside of the rear of the hopper 4 to drop the beans or other article held therein between the penetrating ends 3 and 10ᵇ. When it is desired to plant corn only, the division or partition plate 2 is removed. The slide-plate 15 is then adjusted to close the opening 13 entirely. The corn is then fed from the hopper 4 between the penetrating ends 6 and 10ᵇ through the small opening 14, when the slide is drawn back to bring such opening over the said ends 6 and 10ᵇ. The opening 14 is also provided with a slide 14ᵃ for regulating its size. Scrapers or brushes 17 and 18 are also provided to effect a proper feed of the grain through the openings 13 and 14. To provide for a free and straightway movement of the slides 7 and 12, the adjacent or inner ends have rods 20 and 19 pivotally connected thereto and to the members 1 and 1ᵃ.

From the foregoing description, taken in connection with the accompanying drawings, it is thought the advantages of my improvement will readily appear.

It will be observed that when the parts are arranged as shown in Fig. 2 the corn, beans, and fertilizer will be dropped uniformly at the same time by a single manipulation of the handle members 1 and 1ᵃ. Furthermore, by providing a detachable partition in the hopper 4 and forming the slide 12 with openings 13 and 14 in the manner shown and providing a cut-off for the opening 13 the entire hopper 4 can be used for a single kind of grain.

The several parts constituting my improvement are economically and simply arranged and can be adjusted very quickly for planting different kinds of grain.

Having thus described my invention, what I claim, and desire to secure by Letters Patent, is—

1. A combined hand planter and fertilizer-distributer, comprising two pivotally-connected members, 1 1ᵃ, each of which has a hopper, and chutes attached to such hopper, discharging between the penetrating ends of the members 1 1ᵃ, one of such hoppers having a detachable slide 21, whereby it is divided into two compartments, the slides 12 and 7, having their inner ends attached to the said members by means of rods, the slide 7 having a single opening 7ᵃ, the slide 12 having two openings 13 and 14, having adjustable slides 15 and 14ᵃ and the transverse piece 16, forming a seat for the slide 21, all being arranged substantially as shown and for the purposes described.

2. A combined hand planter and fertilizer-distributer, consisting of the two pivotally-connected members each of which is provided with a hopper, chutes attached to each hopper, one of the said hoppers being divided into compartments by means of a detachable plate, slides having their inner ends attached to the said members by means of rods, openings in said slides, an adjustable plate upon said slides adapted to regulate the size of the said openings, a transverse piece forming a seat for the said detachable plate adapted to form a covering for one of the said openings, and a guard provided with a foot adapted to limit the penetration of the said planter.

JAMES R. LANE.

Witnesses:
GEO. A. EWING,
N. M. HORTON.